Feb. 1, 1966   J. N. LONG   3,232,519
COMPRESSOR PROTECTION SYSTEM
Filed May 7, 1963   5 Sheets-Sheet 1

INVENTOR.
JOSEPH N. LONG
BY
Lieber & Nilles
ATTORNEYS

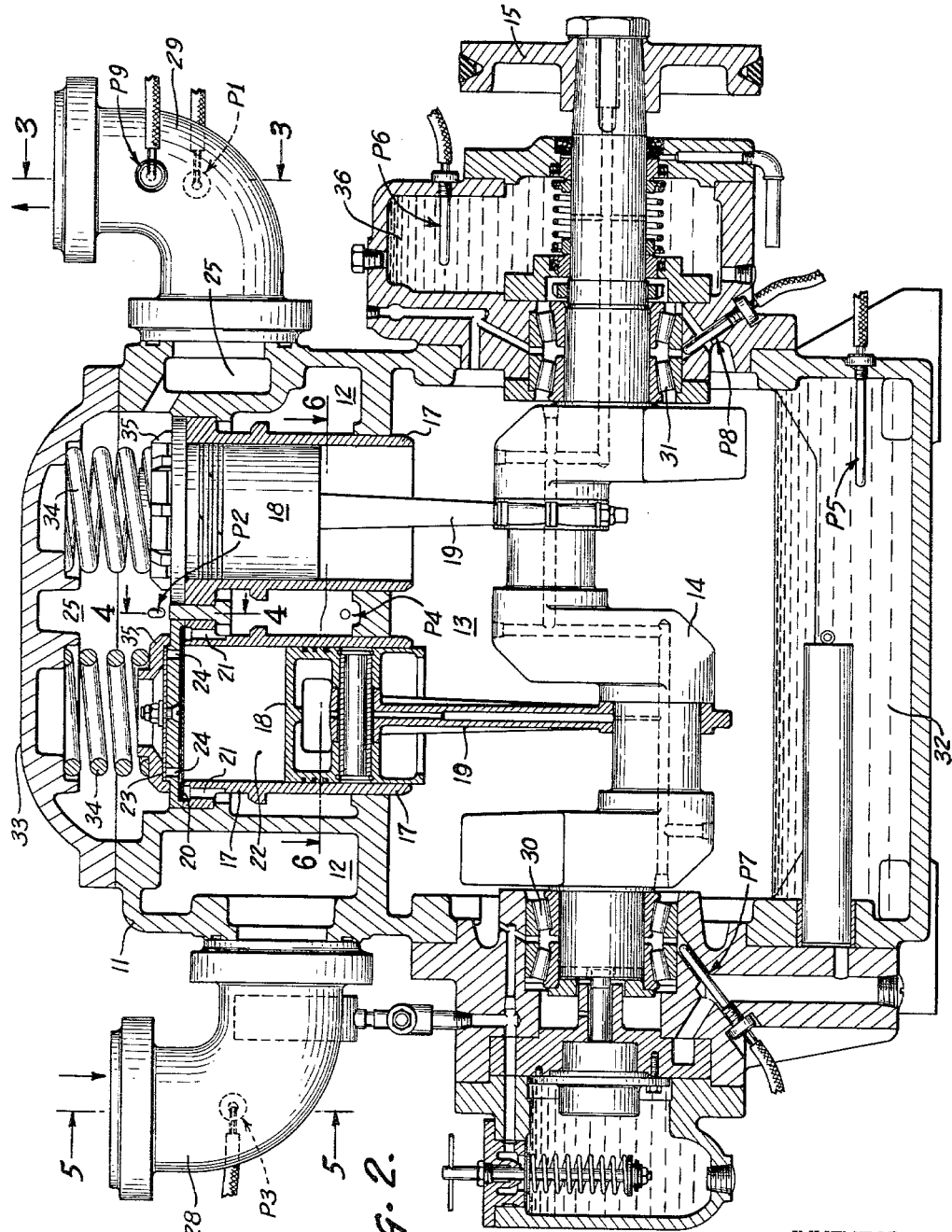

INVENTOR.
JOSEPH N. LONG
BY
Lieber & Nilles
ATTORNEYS

INVENTOR.
JOSEPH N. LONG
BY
Lieber & Nilles
ATTORNEYS

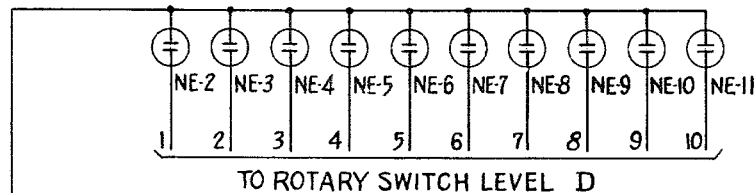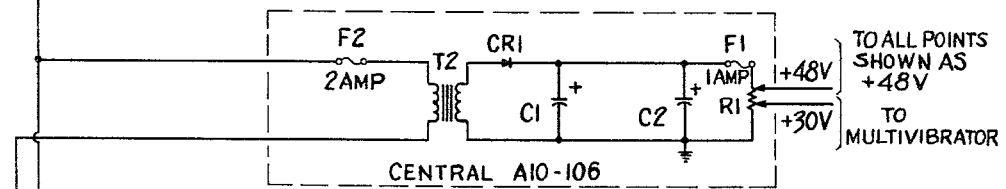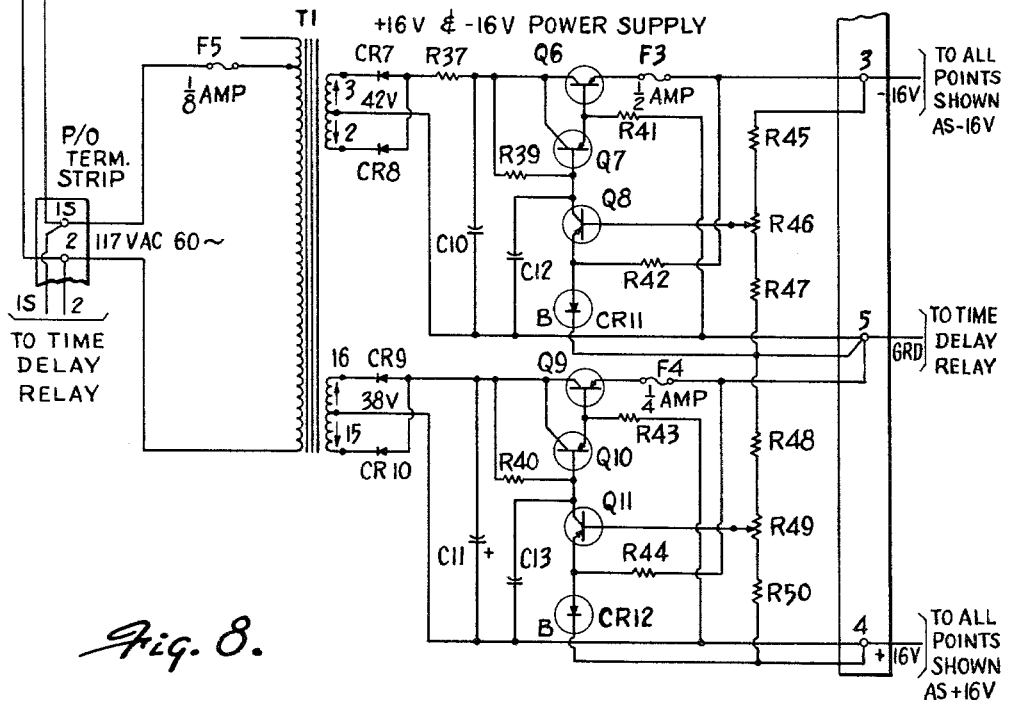
Fig. 8.

United States Patent Office 3,232,519
Patented Feb. 1, 1966

3,232,519
COMPRESSOR PROTECTION SYSTEM
Joseph N. Long, Wauwatosa, Wis., assignor to Vilter Manufacturing Corporation, Milwaukee, Wis., a corporation of Wisconsin
Filed May 7, 1963, Ser. No. 278,624
19 Claims. (Cl. 230—17)

The present invention relates generally to improvements in compressors, and relates more particularly to the provision of improved instrumentalities for sensing and warning of possible malfunctions which may occur during the operation of a compressor or the like.

A primary object of the invention is to provide an improved compressor protection system which is relatively simple and compact in construction, highly efficient in operation, and exteremely flexible in its adaptations.

In the operation of air and gas compressors for diverse purposes, it is not uncommon to experience damage caused by some malfunction which is normally undetectable. Most frequently, the source of such malfunction is internal and cannot be detected by normal observation, even by skilled mechanics. For example, a broken, damaged or sticky valve or a plugged or pinched oil line may not, of itself, be fatal to the operation of the device and may well go undetected, but if continued even for a relatively short period of time, one or more zones of the compressor may become over-heated to such an extent as to cause serious damage, resultant work stoppage and even possible injury to personnel.

While is has been heretofore proposed in some instances to utilize one or more sensing devices at predetermined locations in certain zones in engines, compressors and similar devices for indicating prevailing conditions within such zones, the prior systems and sensing devices merely indicated the prevailing conditions for observation by an operator who, in turn, was required to use his own judgment in reading, comparing and interpreting the information.

Furthermore, in all previous known instances wherein sensing devices have been utilized, there was no attempt made to balance or compare one sensing device and the conditions existing at the zone within which such device was located against another sensing device and the conditions within its zone, and these prior devices were incapable of signaling or warning an operator upon the existence of predetermined differentials in operating conditions within a plurality of zones. Accordingly, while the operator might have become aware of the fact that something was wrong generally with the compressor operation in these prior systems, the location of the trouble could not be pinpointed for convenient repair and maintenance.

It is therefore another object of this invention to provide an improved automatic sensing and warning system for compressors which obviates the disadvantages and objections attendant such prior sensing systems.

Another object of the present invention is to provide automatic temperature scanning and control apparatus for sequentially sampling temperatures at various critical points in a compressor and, from such samplings, sensing prevailing abnormal temperature conditions and causing an audible signal to alert operating personnel while pinpointing the trouble area by indicator means.

Still another object of the invention is to provide an improved compressor safety and protection system wherein a plurality of sensing probes strategically located at various critical areas or zones in the compressor are connected to a resistance network in a manner whereby abnormal temperature variations are monitored to a warning device and trouble indicator to facilitate the performance of rapid remedial action.

An additional object of my present invention is to provide an improved fully automatic device for protecting compressors against damage and which embodies a multiplicity of hyper-sensitive temperature-sensing probes for sampling existing temperatures at a variety of critical areas in the compressor, the probes being coupled to a central compact scanning and control station for continuously comparing temperature differentials between a plurality of sensing points, signaling a warning whenever preset temperature limits are exceeded or when temperature differentials become excessive or drop below preset levels, and preventing or stopping operation during adverse temperature conditions.

A further object of the present invention is to provide a novel and improved compressor safety system which may be readily adjusted and calibrated to indicate and warn of the existence of excessive preselected temperatures in various zones of the compressor and to also indicate and warn of temperature differentials beyond preselected settings as between two or more zones of the compressor.

These and other additional objects and advantages of the invention will become apparent from the following detailed description.

A clear conception of the several features constituting the present invention, and of the mode of utilizing the improvements in typical multi-stage compressors, may be had by referring to the drawings accompanying and forming a part of this specification wherein like reference characters designate the same or similar parts in the various views.

FIG. 2 is an enlarged part sectional view taken longitudinally through the compressor and showing the locations of the sensing probes in a typical installation;

FIG. 8 is another schematic diagram illustrating a typical power supply and control panel for the improved sensing system.

Figure 1:
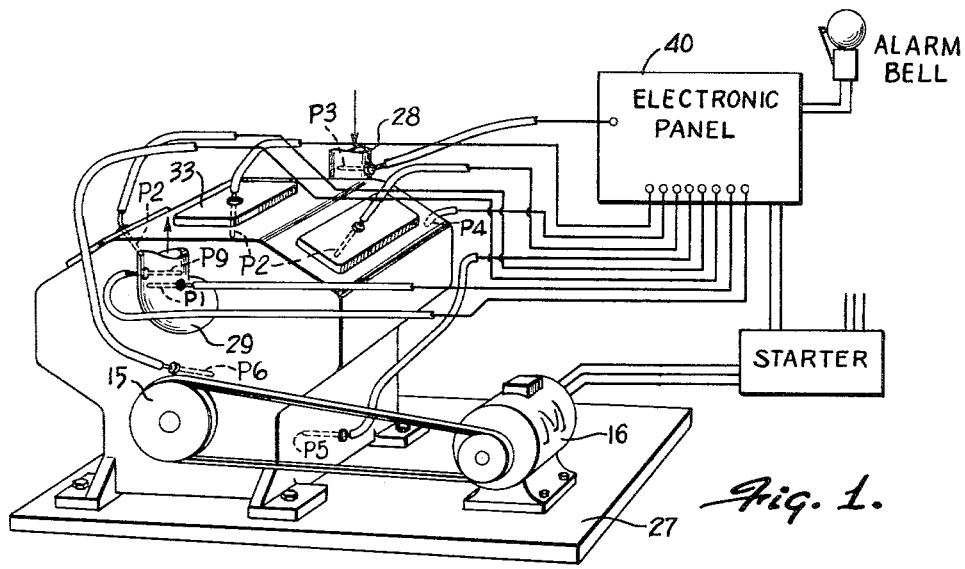
FIG. 1 is a more-or-less diagrammatic perspective view of a typical multi-cylinder piston type gas compressor and motor assembly with the improved sensing means embodied therein and schematically illustrated.
Figures 3, 4, 5:
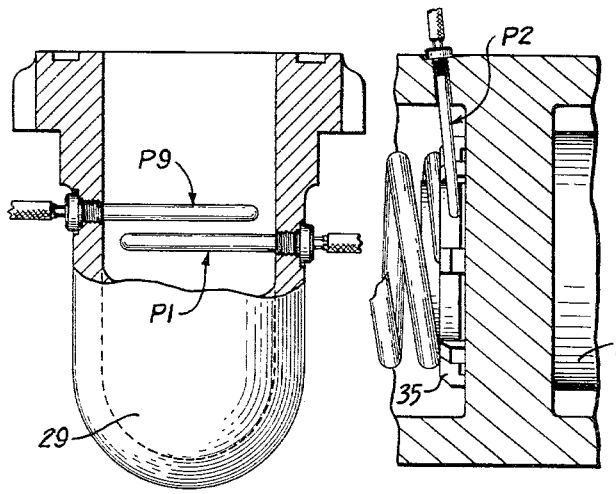
FIG. 3 is an enlarged section taken transversely through the compressor discharge elbow along the line 3—3 of FIG. 2.
FIG. 4 is a section through the compressor frame adjacent one set of cylinders and taken along the line 4—4 of FIG. 2.
FIG. 5 is a section through the suction inlet elbow taken along the line 5—5 of FIG. 2.
Figure 6:
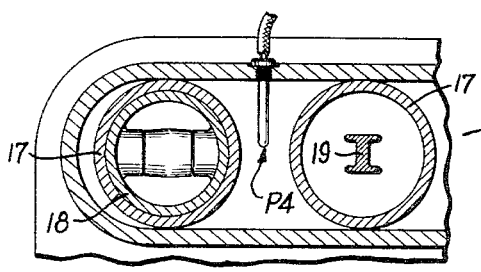
FIG. 6 is a section between a pair of cylinders taken along line 6—6 of FIG. 2.

While the invention has been illustrated and described herein as being embodied in a particular type of gas compressor which has been especially designed for refrigeration service and which embodies six reciprocable motor driven pistons with sensing probes of a particular type located at a plurality of critical areas, it is not intended to thereby unnecessarily limit or restrict the improvements to such specific application and usage since the invention may be applied and used with equal effect in connection with two, four, six, eight, twelve and sixteen cylinder compressors and a greater or lesser number of sensing probes adapted to perform in like manner may also be provided. It is additionally contemplated that certain specific descriptive terms employed herein shall be given the broadest possible interpretation consistent with the disclosure.

Referring to the drawings, the gas compressor illustrated therein as embodying the invention comprises, in general, a main frame 11 having a suction chamber 12 therein and a crankcase 13 within which a crankshaft 14 revolvable, in the crankshaft 14 being driven in a customary manner through a belt and sprocket arrangement 15 by a motor or engine 16. Mounted in the frame 11 and radiating from the axis of the crankshaft 14 are a number of cylinders 17 disposed in pairs, the illustrated device embodying three such pairs of cylinders 17. A piston 18 is reciprocable within each of the cylinders 17 by a connecting rod 19 secured between the piston 18 and the crankshaft 14 in each instance. Surrounding the outer end of each of the cylinders 17 is an annular suction valve 20 which coacts with inlet ports 21 communicable with the suction chamber 12 and with the adjacent piston displacement chamber 22. In turn, an annular discharge valve 23 coacts with an annular series of outlet ports 24 which communicate with the adjacent displacement chamber 22 of each cylinder 17 and which discharge high pressure fluid past the valve 23 into a common compressed gas discharge space or chamber 25.

The main frame 11 is normally formed of a sturdy integral casting and the compressor and its driving motor or engine 16 may conveniently be mounted upon a common support 27 as shown. The suction chamber 12 communicates with a suction line as by way of an elbow fitting 28, and the outlet ports 24 of each cylinder 17 communicate with the common compressed gas discharge space 25 which leads to the high pressure discharge line as by way of an elbow connection 29. The crankshaft 14 is supported for rotation by means of end bearings 30, 31, and suitable lubricating ports and passageways are provided for conducting oil to the various operating parts of the compressor to maintain the same in properly lubricated condition, the oil being supplied to the ports and passageways from a crankcase oil reservoir 32 in a customary manner. In the compressor illustrated, each pair of cylinders 17 is enclosed by a cover 33, and the discharge valves 23 are each resiliently urged toward seated position by means of a coil spring 34 compressed between the cover 33 and a valve cap or guard 35 for each of the valves 23. The extending driven end of the crankshaft is surrounded by an oil seal chamber 36 housing a rotary shaft seal, and this chamber 36 is normally maintained full of oil and is effectively sealed in a customary manner from the exterior.

The compressor thus described and illustrated in the drawings is generally of well-known construction commercially available from Vilter Manufacturing Corporation of Milwaukee, Wisconsin. During normal operation of the compressor, the motor 16 revolves the crankshaft 14 causing it to reciprocate the several sets of pistons 18 in succession during each revolution of their respective cranks. During each inward travel of the pistons 18, gas is drawn through the suction line, inlet elbow 28 and suction chamber 12 via the ports 21 and past the suction valves 20 into the respective displacement chambers 22. Outward travel of each piston 18 as driven by the respective cranks will compress and deliver the gas from within the displacement chambers 22 through the discharge ports 24 and past the discharge valves 23 into the high pressure discharge chamber and conduit 25 and then through the discharge elbow 29 into the discharge line. These compressors are, of course, also provided with unloading devices and capacity control means for preventing delivery of compressed gas from the several cylinders under certain operating conditions, but such mechanism forms no part of the present invention and is therefore not shown or described in detail herein.

In compressors such as described, damage sometimes results due to overheating caused by broken or damaged valves, plugged oil lines or liquid refrigerant leakage. It has accordingly been proposed in the past to provide limit devices for stopping compressor operation upon the existence of predetermined temperatures in a particular zone. Temperature indicating devices have also been heretofore employed at various localities within the compressor so that the temperature conditions within such localities may be visually determined by an operator. However, temperature variations in a particular locality may not necessarily be due to a damaged valve, plugged oil line or other malfunction but may be due to the particular conditions under which the compressor is operating such as when unloading. On the other hand, temperature differentials as between different areas should range within certain limits when the compressor is properly operating, and an excessive or abnormal differential as between certain zones does indicate that there is probably a malfunction due to a broken or damaged valve, a plugged or pinched oil line or the like. Also, when liquid refrigerant moves into the suction conduit of the compressor because of poor operating conditions, faulty expansion valves or the like and fails to evaporate, the liquid moves down the suction conduit and into the suction chamber and is apt to cause damage, and under such conditions, the temperature would fail to rise the required amount in these areas. It is contemplated by this invention to not only sense the temperature conditions within a particular zone and reflect these back to an indicating and control panel but also to sense abnormal or excessive differentials in temperature as between critical zones on the suction side as well as the discharge side, regardless of the operating conditions of the compressor, and to monitor these back to the indicator and warning device. Thus, the invention comprises the provision of a warning system for compressors in which certain conditions prevailing in various critical parts of the compressor are relayed to an electronic panel 40 and compared for the purpose of warning the operator upon failure or malfunction of critical parts of the compressor, the malfunction thus being determined at the critical areas before resultant damage is incurred irregardless of the particular operating conditions and in order that the compressor may be shut down and the trouble corrected promptly.

In practicing the invention, a series of slave thermistors are located at critical zones in the compressor and are connected to a master electronic panel 40. The slave thermistors sense the temperature existing within their respective zones, and a master thermistor is used to sense the refrigerant temperature in the high pressure discharge line from the compressor. The slave thermistors are continuously balanced against the master thermistor to determine any differences in temperature which are, in turn, monitored back to the electronic panel. The electronic control panel is accordingly set to allow a predetermined differential in temperature as between any one of the slave thermistors and the master thermistor and upon reaching the preset differential, the electronic panel will indicate conditions and will either stop the compressor motor, sound an alarm, or both, depending upon the particular arrangement desired. Accordingly, a balancing system is provided which will allow the compressor to operate at varying pressure conditions under certain circumstances without sounding an alarm or in any way disturbing the compressor operation. In other words, despite changes in head temperatures, discharge temperatures or the like due to loading changes on the compressor, the warning and control panel will permit operation as long as the temperature differentials remain within the preset maximum and/or minimum.

While the critical areas within which the sensing devices are located may be varied to a greater or lesser extent, it has been discovered that the most critical areas are in the discharge line from the compressor, the discharge chamber between each pair of cylinders, the suction line entering the compressor, the suction chamber within the compressor, the oil reservoir in the crankcase, the oil seal chamber at the end of the crankshaft, the main bearings for the crankshaft, and a master thermistor also located in the discharge line from the compressor. As hereinabove indicated, the number and locations of the sensing devices may be varied depending upon the type and size of the compressor and/or the extent of control and warnings desired, and if the compressor is such that the chankshaft is supported on additional bearings, a sensing device should be located on such additional bearings.

As illustrated in the accompanying drawings, the thermistors or probes in the particular type of compressor shown and described herein are located at the following zones within the compressor and are identified by the numerals P1 to P9 inclusive. In the system shown, the thermistor probe P1 is located in the high pressure discharge conduit and may be conveniently extended into the elbow 29 as shown without adversely obstructing the flow. Probe P2 is advantageously located in the discharge chamber 25 between each pair of cylinders 17 and may be extended into the chamber 25 from one side thereof through the compressor casing without interfering with the compressor operation. The probes P1 and P2 are so adjusted and set as to issue a warning and/or shut down the compressor when any one of the P2 probes registers in excess of 20° F. above the temperature of the P1 probe regardless of the operating temperatures. Probe P3 is extended into the low pressure suction side of the compressor and may be located conveniently within the elbow 28 without adversely interfering with the compressor operation. Probe P4 is located in the suction chamber 12 within the interior of the compressor and is extended through the casing as shown likewise without interference with the compressor operation, the probes P4 and P3 being adjusted so that the compressor will shut down and a warning sounded when the P4 probe registers less than 10° F. higher than probe P3 regardless of the temperature present at P3. Probe P5 as shown extends through the wall of the crankcase oil reservoir 32 into the oil contained therein, and this probe P5 is set to issue a warning and stop the compressor at desired preselected temperatures. Probe P6 extends through a wall of the oil seal chamber 36 and into the oil contained therein, and this probe may likewise be preset to sound an alarm and stop the compressor operation at selected temperatures. Probes P7 and P8 are located so as to extend through the compressor casing adjacent to the main bearings 30, 31 respectively, and the setting of these probes is such as to sound a warning and stop the compressor when the temperature at either of the bearings reaches a preselected maximum. It should be noted, that if the compressor is such as to have more than two main bearings for the crankshaft, additional probes should preferably be located adjacent such bearings. Probe P9 is located in the discharge line from the compressor and may also be extended into the elbow fitting 29 as in the case of probe P1. This probe P9 is set to stop the compressor operation upon the existence of preselected maximum temperatures and to likewise warn the operator of such conditions.

The thermistor probes shown more-or-less diagrammatically in the drawings are of well-known construction and are commercially available from various sources such as, for example, the Thermistor Division of Keystone Carbon Company of St. Marys, Pennsylvania. However, for satisfactory performance under the conditions to which they are exposed, these thermistors should be selected as follows: P1 should be capable of operating within a temperature range of 120° F. to 300° F.; P2 should have an operating range of 20° F. above the temperature range of P1; P3 should give satisfactory performance within a range of at least −60° F. to 100° F.; P4 should perform at temperatures 10° F. higher than the range of P3; P5 and P6 must at least withstand temperatures above 140° F.; P7, P8 and any others used at the main bearings should operate at temperatures in excess of 150° F.; and P9 should be operative at temperatures in excess of 300° F. In compressors up to eight cylinders, it has been found necessary to employ only one P1 and one P9 probe with two of each of these probes being used on larger sizes. With respect to the P2 probe, one of these is used for each pair of cylinders in the type of compressor illustrated, and all compressors, regardless of size, need have only one P3, P5 and P6 probe. In compressors up to eight cylinders, it is preferable to use two P4 probes with four such probes being used in larger models, and a single P7 or P8 probe is all that is necessary for each bearing. It has also been found that the temperature tolerance on the thermocouples for safety shut off of probes P5 through P9 may range from a plus or minus 5° F., and the tolerance on the thermocouples for P1 through P4 should be held somewhat closer, on the order of plus or minus 2° F.

Figure 7:
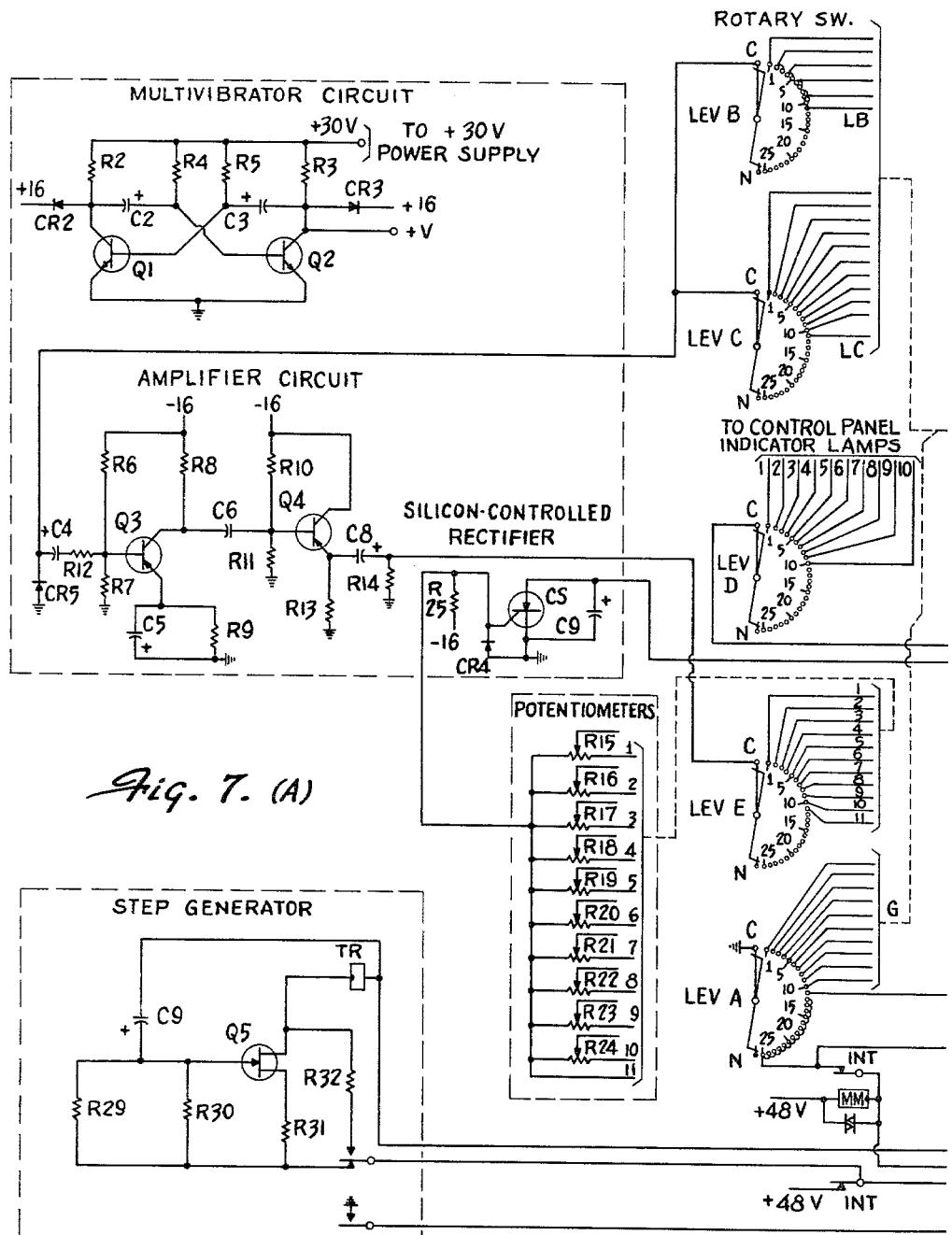
FIGS. 7A and 7B show a schematic wiring diagram of a typical temperature scanning and control system for the compressor and emobdying the invention.
Figure 7:
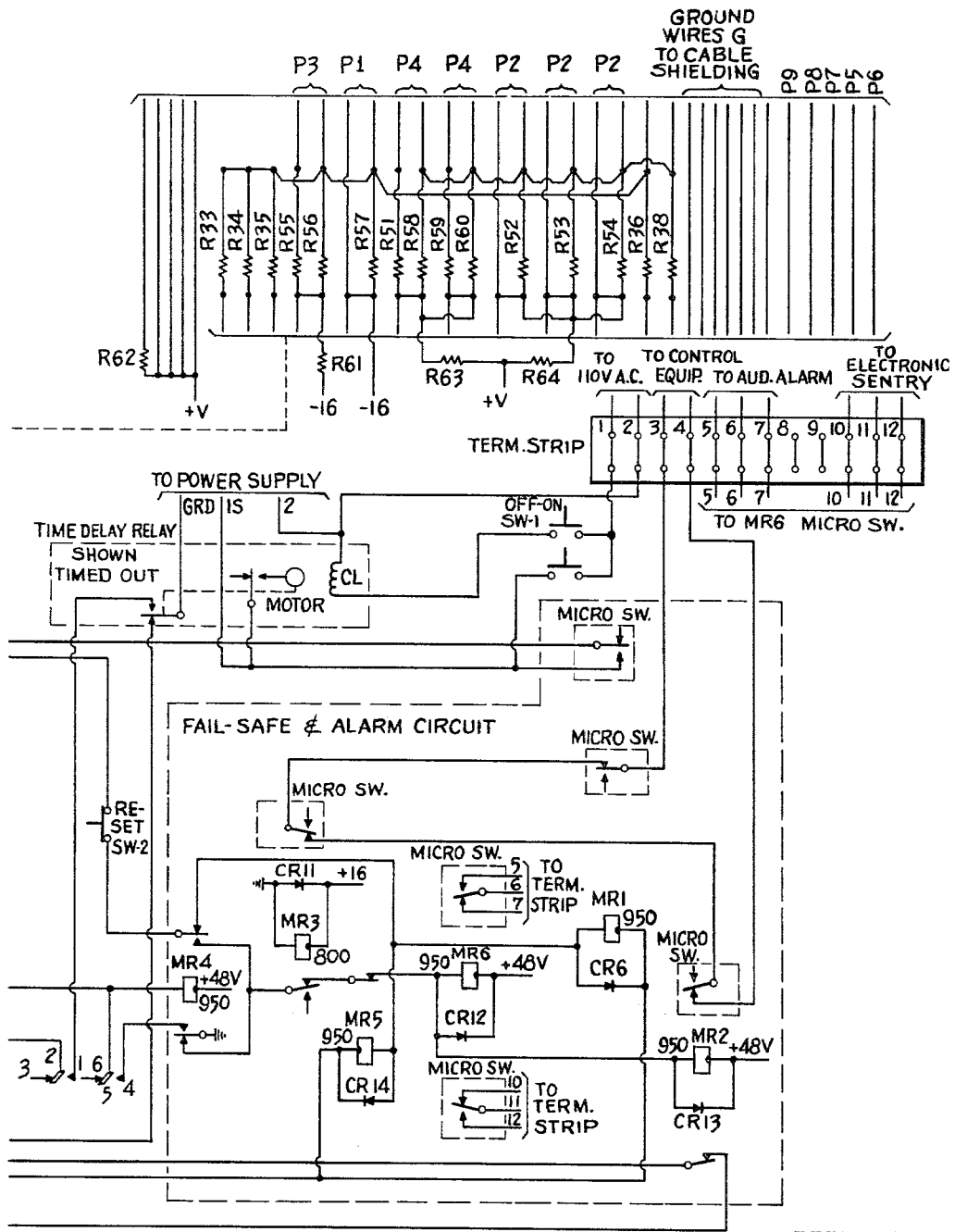

A typical wiring circuit for the improved safety system is illustarted in FIG. 7 wherein the lead wires for the respective probes are identified by the references P1 to P9 inclusive. In the system shown, the sequential scanning of the thermistor probes is accomplished by a rotary switch having five levels and which is commercially available from the Automatic Electric Company of Northlake, Illinois. This rotary switch, the levels of which are identified as A, B, C, D and E, is pulsed by an electric step generator which includes a unijunction transistor Q5 and relay TR. Capacitor C9 and resistor R29 and R30 provide for a time interval between outputs of transistor Q5. When transistor Q5 conducts, relay TR operates, closing ground to the motor magnet MM of the rotary switch through its interrupter springs and contacts of relay MR2. The rotary switch steps, opens its interrupters and removes battery from relay TR. Relay TR is de-energized and battery is again closed to transistor Q5 and the capacitor-resistor network; capacitor C9 charges positively and drives transistor Q5 into conduction. Capacitor C9 discharges through relay TR and the path provided by transistor Q5 (which is conducting), causing relay TR to operate; this process continues repeatedly. The rotary switch follows the pulsing of the step generator, thus stepping its wipers across the rotary switch bank contacts. This action associates the calibration biasing resistors and the alarm indicating lamps with the proper temperature-sensing thermistors.

The present temperature scanning and control system uses an astable multivibrator to provide a square-wave output with an amplitude of +16 volts at 100 cycles per second. This system is used because it permits the use of an A.-C. amplifier to ensure stability and a high degree of sensitivity. It is this positive pulsating voltage, the amplitude of which is determined by the voltage dividing network and the thermistors, that determines an alarm condition.

The thermistors are used in conjunction with a resistance network to provide a means for sensing the various alarm conditions. When one particular temperature is to be sensed, as in the case of probes P5, P6, P7, P8 and P9, a fixed resistor and a thermistor is used; and where differential temperatures are to be monitored, as in the case of probes P1 and P2 as well as in the case of probes P3 and P4, two thermistors are used in the circuit. The actual thermistor circuit is basically a voltage divider with a negative voltage on one leg and an equal, pulsating, positive voltage (multivibrator output) on the other leg. The output of the voltage divider is biased so that only positive pulses (which indicate alarm conditions) are recognized.

Thermistor operation is such that an increase in temperature causes a decrease in thermistor resistance. When a rise in temperature occurs, the lowered thermistor resistance allows the positive pulses to overcome the negative voltage of the voltage divider network. Eventually a point is reached where the output of the circuit goes positive, this positive pulsating voltage being capacitively coupled to the amplifier circuit as illustrated in FIG. 7.

The transistorized amplifier circuit is used to amplify the low-voltage output of the thermistors. In addition, this amplifier helps discriminate between small temperature changes and finally (during alarm conditions) provides enough power output to fire the silicon-controlled rectifier CS. This silicon-controlled rectifier CS converts the low-voltage alarm condition to a high-voltage power signal which is used to operate two alarm relays (MR1 and MR5).

Between the output of the amplifier circuit and the input of the silicon-controlled rectifier is a variable biasing network. This network consists of the potentiometers R15 through R24 shown in FIG. 7. These potentiometers may be individually adjusted to provide variations in the amplifier output voltage, which fires the silicon-controlled rectifier CS, and thus enable system calibration.

When the silicon-controlled rectifier CS fires, the high-voltage power signal causes alarm relays MR1 and MR5 to operate. The relay MR1 microswitch contacts transfer, closing power to the appropriate control panel indicator lamp through the rotary switch, and the lamp is lighted indicating the trouble area. Relay MR1 also opens the power circuit to the control equipment, stopping the entire system. Thus operated, relay MR5 opens the holding circuit to relays MR6 and MR2, and relay MR2 drops out, while relay MR6 microswitch contacts transfer, causing the audible alarm to sound. Relay MR6 may also be used to initiate a call to a predetermined telephone number so that a recorded warning message may be given, and for this purpose, a device commercially available from Electronic Secretary Industries, Inc. of Waukesha, Wisconsin under the trademark "Electronic Sentry" may be utilized.

This entire system is designed to provide fail-safe operation so that any failure within the temperature scanning and control system will have the same effect as if an alarm condition had been sensed. All system voltages and critical elements are automatically monitored to ensure proper operation. Relays MR2, MR3, MR4, and MR6 (FIG. 7) complete circuits to identify or locate the alarm condition, sound the audible signal, and automatically shut down the operating or control equipment.

If the unattended option of relaying warning by telephone is used, this system initiates the dialing of a predetermined telephone number to effect the delivery of a recorded warning message.

The 48-volt D.-C. power supply as shown in FIG. 8 provides operating power to relays MR2 and MR6 in parallel through contacts of relays MR3, MR4, and MR5. Therefore, failure of the 48-volt D.-C. power supply will cause relays MR2 and MR6 to be de-energized. The micro-switch contacts on de-energized relay MR2 transfer and opens the circuit to the control equipment to stop operation of the system. The microswitch contacts on relay MR6 transfer to complete circuits to the audible alarm and to the telephone hookup when used.

The +16 and −16-volt D.-C. power supply (FIG. 8) provides +16-volt operating power to relay MR3. Failure of the +16-volt power output will therefore cause relay MR3 to drop out. The micro-switch contacts on de-energized relay MR3 transfer and opens the circuit to the control equipment to stop system operation. Simultaneous transfer on the other set of MR3 contacts opens the circuit to relays MR2 and MR6. Relays MR2 and MR6 are de-energized, stop system operation, sound the audible alarm; and, if the "Electronic Sentry" is used, initiate its operation.

The amplifier and silicon-controlled rectifier (FIG. 7) are checked for proper operation at the completion of every scan cycle. When the rotary switch level A wiper steps to the eleventh bank contact, ground through the rotary switch wiper causes relay MR4 to operate. Relays MR2 and MR6 are normally held operated by ground through the contacts of unoperated relay MR4. Operation of relay MR4 transfers the holding ground for relays MR2 and MR6 from the contacts of MR4 to a holding circuit through the silicon-controlled rectifier. Positive pulses via rotary switch bank contact 11, level C, are applied to the amplifier. If the amplifier has the proper output level to fire the silicon-controlled rectifier, the rectifier will be turned on and the circuit to ground through the rectifier will hold relays MR2 and MR4 operated. If the amplifier or the silicon-controlled rectifier is defective, the holding circuit to relays MR2 and MR6 will be effectively open, causing these relays to drop out. Again, these relays will stop system operation, sound the audible alarm, and initiate operation of the telephone call system if used.

The temperature scanning and control system offers two modes of operation: timed and untimed. The timed mode of operation is used when starting equipment that has not yet reached its normal operating temperature. This mode provides operating power to the entire system, allowing equipment to start operating, but causes the rotary switch (which effects scanning of the thermistor probes) to "home." The scanner remains in the home position for a present time which is adjustable from four to twenty-two minutes. This adjustment is made at the time delay relay shown in FIG. 7. This time delay relay allows the operating equipment to warm up sufficiently without causing automatic equipment shutdown and false alarm conditions due to abnormal temperatures encountered during starting.

Operation of the time delay relay (accomplished by depressing the button in the center of the ON/OFF switch) sets the timing mechanism and transfers ground from relay TR in the step generator to rotary switch off-normal springs 1–2–3. If the rotary switch is in any position other than home, the closed off-normal springs will cause the rotary switch to step to its home positon. Off-normal springs 4–5–6 on the rotary switch function to hold relay MR4 operated to prevent false alarm indications while the rotary switch is stepping to its home position. When the time delay relay times-out, ground is transferred from rotary switch off-normal springs 1–2–3 and is again closed to relay TR in the step generator. The step generator starts to pulse the rotary switch and the scanning operation begins.

The untimed mode of starting operation is used when restarting warm equipment. Power is applied to the entire system; however, the time delay relay is not operated and the scanning of the thermistor probes starts immediately upon power application.

When this system is operational, automatic equipment shutdown occurs under two conditions. The first condition is an alarm temperature sensed at one of the thermistor probes. This condition is indicated by the lighting of an associated control panel alarm lamp (FIG. 8). This alarm condition may be verified by depressing the reset button on the control panel. The scanner restarts, and if the alarm condition persists, the scanner will stop at the same position during the next scan cycle.

The second condition which will cause the equipment to stop is the operation of the fail-safe system. Fail-safe operation is indicated by the stoppage of all equipment and the absence of a lighted alarm lamp at the control panel. The exception to this rule, is when failure of the 48-volt D.-C. power supply may occasionally cause one of the control panel alarm lamps to be lighted. However, this condition can be readily determined by observing that the scanning operation is not resumed when the control panel reset button is depressed.

The timed mode of starting operation (used when starting cold equipment) is initiated by performing the following operations in sequence.

(a) Apply 115-volt, 60-cycle A.-C. power to the system.
(b) Depress the button in the center of the ON/OFF switch.
(c) Rotate the ON/OFF switch to the ON position.

This sequence initiates timing-out of the time delay relay and thus provides time for the equipment to warm up before beginning the scanning operation.

The untimed mode of operation (used when restarting warmed-up equipment) is initiated by performing the following operations in sequence.

(a) Apply 115-volt, 60-cycle A.-C. power to the system.
(b) Rotate the ON/OFF switch to its ON position.

This sequence applies power to the entire system for immediate scanning operation.

From the foregoing detailed description, it is apparent that an automatic operable temperature scanning and control system has been provided and functions to sample temperatures at multiple sensing points in a compressor. The temperature sensitive thermistor probes are arranged to provide both audible and visual alarms whenever temperature limits are exceeded and when desired the probes may be made still more sensitive through use of an amplifier circuit. The system can be arranged to provide alarms when specific fixed temperatures are exceeded, whenever temperature differentials between multiplicity of sensing points become excessive, or whenever temperature differentials between two sensing points drop below a present level, and anyone or all of these combinations can be utilized when desired. Moreover, the improved system may be adapted for use in connection with any desired number of compressors and may be incorporated as a complete operating unit. The system may be calibrated to furnish an alarm when crankcase oil temperatures exceed 140° F., when oil seal chamber temperatures exceed 150° F., and whenever the compressor discharge line temperature exceeds 300° F. In monitoring temperature differentials, the system can be calibrated so as to sample temperatures between the compressor discharge line and the discharge chamber between pairs of cylinders, and the system may allow these temperatures to vary between 120° F. and 300° F. as long as the temperature in the discharge chamber does not exceed the temperature in the discharge line by more than 20° F. If the temperature in the discharge chamber exceeds that in the discharge line by more than 20°, the alarm will be sounded but the temperature in the discharge chamber may be less than 20° above that in the discharge line and may even drop below that of the discharge line without causing an alarm to sound. Again, as a sample of temperature differential sensing, the system may be set to sound an alarm if the temperature in the suction chamber is less than 10° F. above the temperature in the suction line, and these temperatures may fluctuate between −60° F. and 100° F. as long as the temperature in the suction chamber exceeds the temperature in the suction line by at least 10°, but the temperature in the suction line may be more than 10° below that in the suction chamber without causing an alarm condition.

Various modes of carrying out the invention are contemplated as being within the scope of the following claims particularly pointing out and distinctly claiming the subject matter which is regarded as the invention.

I claim:

1. In an elastic fluid compressor having a casing housing compression mechanism and defining suction and discharge chambers communicating respectively with the low and high pressure sides of the compression mechanism and with external suction and discharge conduits, a first temperature sensing device mounted to extend into the suction conduit, a second sensing device mounted to extend into the suction chamber, a third sensing device mounted to extend into the discharge chamber, a fourth sensing device mounted to extend into the discharge conduit, and means coupling said sensing devices for a constant comparison of the temperature conditions prevailing in the zones of the several sensing devices.

2. In an elastic fluid compressor having a casing housing compression mechanism and defining suction and discharge chambers communicating respectively with the low and high pressure sides of the compression mechanism and with external suction and discharge conduits, a first temperature sensing device mounted to extend into the first zone as defined by the suction conduit, a second sensing device mounted to extend into the second zone as defined by the suction chamber, a third sensing device mounted to extend into the third zone as defined by the discharge chamber, a fourth sensing device mounted to extend into the fourth zone as defined by the discharge conduit, means coupling said first and second sensing devices for a constant comparison of the temperature conditions prevailing in the zones of the suction conduit and suction chamber, and means coupling said third and fourth sensing devices for a constant comparison of the temperature conditions prevailing in the zones of the discharge chamber and discharge conduit.

3. An elastic fluid compressor according to claim 2, wherein means are additionally provided for signalling a warning upon the existence of a predetermined temperature differential in the first and second zones.

4. An elastic fluid compressor according to claim 2, wherein means are additionally provided for signalling a warning upon the existence of a predetermined temperature differential in the third and fourth zones.

5. An elastic fluid compressor according to claim 2, wherein means are provided for stopping operation of the compressor and means are also provided for signalling a warning upon the existence of a predetermined temperature differential in the first and second zones.

6. An elastic fluid compressor, according to claim 2, wherein means are provided for stopping the compressor operation and means are also provided for signalling a warning upon the existence of a predetermined temperature differential in the third and fourth zones.

7. An elastic fluid compressor according to claim 2, wherein means are provided for stopping the compressor operation and means are also provided for signalling a warning upon the existence of a predetermined temperature differential in the first and second zones, and in which means are additionally provided for stopping the compressor operation and means are also provided for signalling a warning upon the existence of a predetermined temperature differential in the third and fourth zones.

8. An elastic fluid compressor, according to claim 2, wherein means are provided for monitoring the temperatures from all four of the sensing devices to a common control panel and means are also provided for issuing a warning from said control panel upon the existence of a predetermined temperature differential in the first and second zones as well as in the third and fourth zones.

9. In an elastic fluid compressor having a casing housing compression mechanism including bearings, an oil seal chamber and an oil reservoir and also defining suction and discharge chambers communicating respectively with the low and high pressure sides of the compression mechanism and with external suction and discharge conduits, a first temperature sensing device mounted to extend into the first zone as defined by the suction conduit, a second sensing device mounted to extend into the second zone as defined by the suction chamber, a third sensing device mounted to extend into the third zone as defined by the discharge chamber, a fourth sensing device mounted to extend into the fourth zone as defined by the discharge conduit, means coupling said first and second sensing devices for a constant comparison of the temperature conditions prevailing in the zones of the suction conduit and suction chamber, means coupling said third and fourth sensing devices for a constant comparison of the temperature conditions prevailing in the zones of the discharge chamber and discharge conduit, and additional sensing devices mounted to extend into the zones of the bearings, oil seal chamber and oil reservoir.

10. An elastic fluid compressor according to claim 9, wherein means are provided for signalling a warning upon the existence of predetermined temperatures in any one of the zones of the additional sensing devices.

11. An elastic fluid compressor according to claim 10, wherein means are additionally provided for automatically stopping operation of the compressor upon existence of the predetermined temperatures in any one of the zones of the additional sensing devices.

12. An elastic fluid compressor according to claim 9, wherein means are provided for signalling a warning upon the existence of predetermined temperature differentials in the first and second zones and in the third and fourth zones and means are also provided for signalling a warning upon the existence of predetermined abnormal temperatures in any one of the additional zones.

13. An elastic fluid compressor according to claim 12, wherein means are additionally provided for automatically stopping operation of the compressor upon the existence of the predetermined temperature differentials in the first and second zones and in the third and fourth zones and means also provided for stopping the compressor upon the existence of predetermined abnormal temperatures in any one of the additional zones.

14. A protection system for an elastic fluid compressor having a casing housing a plurality of compression piston cylinders and also defining suction and discharge chambers communicating respectively with the low and high pressure sides of the compression cylinders and with external suction and discharge conduits, said system comprising a first thermistor probe mounted to extend into the first zone as defined by the suction conduit, a second thermistor probe mounted to extend into the second zone as defined by the suction chamber, a third thermistor probe mounted to extend into the third zone as defined by the discharge chamber between two of the cylinders, a fourth thermistor probe mounted to extend into the fourth zone as defined by the discharge conduit, means coupling said first and second thermistor probes for a constant comparison of the temperature conditions prevailing in the zones of the suction conduit and suction chamber, and means coupling said third and fourth thermistor probes for a constant comparison of the temperature conditions prevailing in the zones of the discharge chamber and discharge conduit.

15. A protection system for an elastic fluid compressor according to claim 14, wherein means are provided for signalling a warning upon the existence of predetermined temperature differentials between the first and second zones and means are also provided for signalling a warning upon the existence of predetermined temperature differentials between the third and fourth zones.

16. A protection system for an elastic fluid compressor according to claim 15, wherein means are additionally provided for automatically stopping the compressor operation upon the existence of predetermined temperature differentials between the first and second zones and means are also provided for stopping the compressor upon the existence of predetermined temperature differentials between the third and fourth zones.

17. A protection system for an elastic fluid compressor according to claim 14, wherein a fifth thermistor probe is mounted to also extend into the zone of the discharge conduit independently of the fourth thermistor probe.

18. A protection system for an elastic fluid compressor according to claim 17, wherein means are additionally provided for signalling a warning and means are also provided for stopping the compressor operation upon the existence of a predetermined temperature in the zone of the discharge conduit as measured by the fifth thermistor probe.

19. A protection system for an elastic fluid compressor having a casing housing a plurality of compression piston cylinders, a crankshaft, bearings for the crankshaft, an oil reservoir and an oil seal chamber and also defining suction and discharge chambers communicating respectively with the low and high pressure sides of the compression cylinders and with external suction and discharge conduits, said system comprising a first thermistor probe mounted to extend into the zone of the suction conduit, a second thermistor probe mounted to extend into the zone of the suction chamber, a third thermistor probe mounted to extend into the zone of the discharge chamber between two of the cylinders, a fourth thermistor probe mounted to extend into the zone of the discharge conduit, means coupling said first and second thermistor probes for a constant comparison of the temperature conditions prevailing in the zones of the suction conduit and suction chamber, means coupling said third and fourth thermistor probes for a constant comparison of the temperature conditions prevailing in the zones of the discharge chamber and discharge conduit, means for signalling a warning upon the existence of predetermined temperature differentials in the zones of the suction conduit and suction chamber and means for also signalling a warning upon the existence of predetermined temperature differentials in the zones of the discharge chamber and discharge conduit, a fifth thermistor probe mounted to extend into the zone of the bearings, a sixth thermistor probe mounted to extend into the zone of the oil reservoir, a seventh thermistor probe mounted to extend into the zone of the oil seal chamber, an eighth thermistor probe mounted to extend into the zone of the discharge conduit independently of said fourth thermistor probe, and means for also signalling warnings upon the existence of predetermined abnormal temperatures in any one of the additional zones.

References Cited by the Examiner

UNITED STATES PATENTS

| 3,065,462 | 11/1962 | Maltby et al. | 340—213 |
| 3,068,450 | 12/1962 | Fletcher et al. | 340—213 |
| 3,105,629 | 10/1963 | Van Vooren | 230—18 |

FOREIGN PATENTS

| 392,116 | 5/1933 | Great Britain. |

NEIL C. READ, *Primary Examiner.*